Patented Apr. 23, 1935

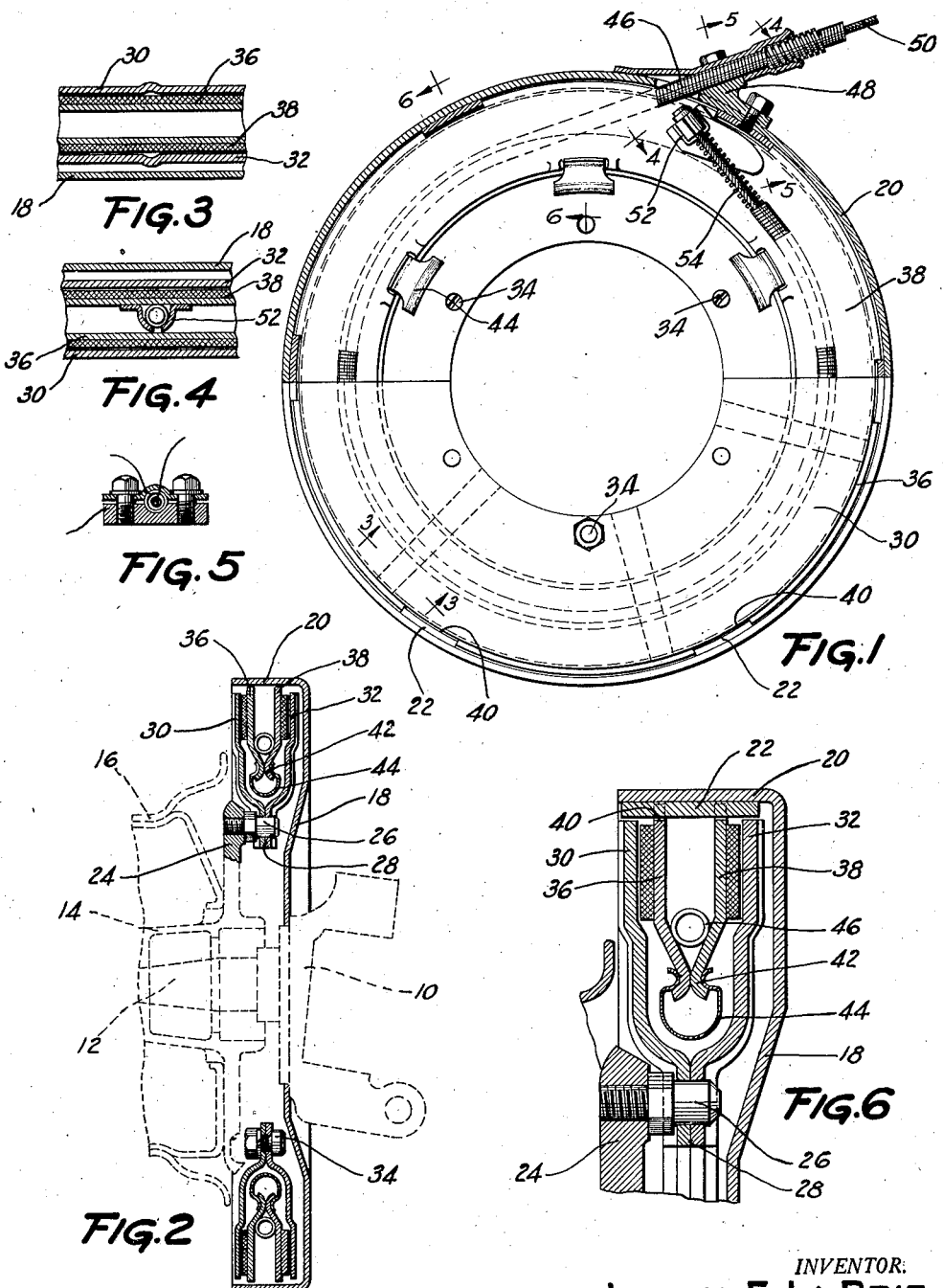

1,998,675

UNITED STATES PATENT OFFICE 1,998,675

BRAKE

Ludger E. La Brie, South Bend, Ind., assignor to Bendix Aviation Corporation, South Bend, Ind., a corporation of Delaware Application May 31, 1932, Serial No. 614,558

12 Claims. (Cl. 188—72)

This invention relates to brakes, and more particularly to disk brakes.

Although considerable effort has been expended on the production of disk brakes, no brake of this type has proved entirely satisfactory. There appear to be several difficulties encountered, among which is the complexity of the applying mechanism, the difficulty in radiating the heat from the braking surfaces and the low effectiveness of a disk brake as compared to an internal or external expanded brake. The present invention aims to overcome these difficulties.

An object of the invention is to provide a disk brake, the several parts of which may be simple stampings which do not require close working limits.

Another object of the invention is to provide a disk brake including a plurality of stampings upon which the required machine work is reduced to a minimum.

A further object of the invention is to provide a disk brake in which adjustment due to wear is avoided.

A feature of the invention is a rotatable member substantially U-shaped in cross section and a floating friction element adaptable to be spread into engagement with the rotatable member by a cable.

Other objects and features of the invention will be apparent from the following description, taken in connection with the drawing which form a part of this specification, and in which:

Figure 1 is a side elevation of a brake structure, partly in section, illustrating the invention as applied;

Figure 2 is a vertical sectional view illustrating the brake as applied;

Figure 3 is a sectional view substantially on line 3—3, Figure 1;

Figure 4 is a sectional view substantially on line 4—4, Figure 1;

Figure 5 is a sectional view substantially on line 5—5, Figure 1;

Figure 6 is a sectional view substantially on line 6—6, Figure 1.

Referring to the drawing for more specific details of the invention, 10 represents a swivelling knuckle having formed integral therewith a spindle 12 on which is mounted for rotation a hub 14. The hub has positioned thereon the conventional wheel 16. Suitably secured to the knuckle 10 is a disk 18 having a lateral flange 20 on the inner periphery of which is suitably secured spaced torque-taking members 22.

The hub 14 has formed thereon a circumferential flange 24 on which are positioned spaced studs 26. These studs support an axially movable rotatable member 28 including two spaced annular members 30 and 32, the inner peripheries of which are offset and suitably secured together as by bolts 34 to form in effect an annular friction element substantially U-shaped in cross section.

Positioned between the members 30 and 32 is the friction element including two corresponding annular members 36 and 38 having arranged upon their oppositely disposed faces suitable friction material adaptable for engagement with the braking surfaces 30 and 32. The annular members 36 and 38 are provided with peripheral notches 40 for the reception of the torque-taking plates 22 on the flange 20. The inner perimeters of the members 38 and 40 are offset and flanged as indicated at 42, and embracing these flanges are compression springs or clips 44 arranged in spaced relation. These springs serve to retain and return the friction disks or members 36 and 38 to their normal position.

Positioned between the friction members 36 and 38 is a conduit 46. The conduit is secured in a fixed position by a suitable bracket 48 on the flange 20 of the disk 18. The conduit has positioned therein a cable 50, the inner end of which is secured in a suitable bracket 52 spot-welded or otherwise secured to one of the friction members 36 or 38. The cable has positioned thereon between the bracket 52 and the inner end of the conduit a return spring 54.

After the cable and conduit have been assembled and secured in place and the component parts of the brake assembled together with the wheel hub the studs 26 on the flange 24 center the rotating disk assembly readily and provide a small clearance between the rotating disk and the torque-taking members. Both the stationary disks and the rotating disks are free to float axially on the members 22 and studs 26, and the rotary discs may shift radially an amount permitted by the clearance 40.

It is generally conceded that the effectiveness of a disk brake is considerably lower than that of a servo shoe brake and a little lower than a conventional two shoe non-servo brake. However, the braking results would probably be better than that of the non-servo shoe brake due to the fact that less movement of the hookup is required to take up clearance making possible a greater multiplication of the pedal pressure.

In operation, force is applied to the cable 50 through suitable applying means, not shown.

The applied force tends to contract the ring formed by the cable and its associated conduit positioned between the friction members 36 and 38, causing these members to spread into engagement with the axially movable rotatable members 30 and 32. Since these members are connected to a flange on the drum of the wheel, rotation of the wheel is effectively retarded. The torque imposed on the friction elements is taken through its connection with the flange 20 on the disk 18. Upon release of the applied force the cable is returned to its normal position by means of the spring 54, and that part of the conduit between the stationary disk is returned to released position by its own initial tension, the cable spring and the disk return spring 44.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising an axially movable rotatable friction element including two annular disks having offset portions secured together to provide opposed braking surfaces.

2. A brake comprising an axially movable rotatable member including corresponding annular disks having offset portions on their inner perimeters.

3. A brake structure comprising an axially movable friction element including corresponding disks having flanges on their inner perimeters and compression springs embracing the flanges.

4. A brake structure comprising a friction element including corresponding annular members having offset portions on their inner perimeters terminating in flanges and clips embracing the flanges.

5. A brake structure comprising a channeled axially movable rotatable member, an axially movable member positioned in the channel including corresponding annular members arranged in spaced relation, tension members securing the annular members together and expanding means between the axially movable members.

6. A brake comprising a fixed support, a rotatable member associated therewith, an axially movable friction element carried by the rotatable member, a floating friction element on the fixed support and means for expanding the floating friction element including a circumferentially extending cable.

7. A brake comprising corresponding friction elements, tension members securing the friction elements together and a cable looped between the friction elements having one end secured to the friction elements and its other end extending tangentially to the friction elements.

8. A brake comprising a fixed support, a rotatable axially movable friction element associated therewith including spaced braking surfaces, an axially movable friction element adapted for cooperation with the braking surfaces, the axially movable friction element including corresponding disks, tension members securing the disks together, a cable looped between the disks and means for decreasing the diameter of the loop to effectively engage the axially movable friction element with the braking surfaces on the rotatable friction element.

9. A brake comprising corresponding annular friction elements, tension members connecting the elements and a cable looped between the elements having one end secured to the elements and its other end extending tangentially therefrom.

10. A brake comprising a fixed support, a friction element movable axially thereto including corresponding members, tension elements yieldingly securing the members together, a conduit secured to the fixed support and extending through the wall thereof having its inner end looped between the members and a cable extending through the conduit having its inner end secured to the members.

11. A brake comprising a fixed support having a flange, a rotatable member associated therewith, a friction element axially movable on the rotatable member including corresponding members having offset portions secured together to retain the members in spaced relation, a friction element axially movable on the flange between the members including corresponding friction elements, means for yieldingly receiving the elements together and means for spreading the friction element including a cable looped between the friction element.

12. A brake comprising a friction element including corresponding annular discs having offset portions on their inner perimeters secured together, and rotatable means axially slidably engaging said offset portions to transmit rotary movement to said element.

LUDGER E. LA BRIE.

CERTIFICATE OF CORRECTION.

Patent No. 1,998,675. April 23, 1935.

LUDGER E. LA BRIE.

It is hereby certified that error appears in the printed specification of the above numbered patent requiring correction as follows: Page 2, second column, line 45, claim 11, for "receiving" read securing; and that the said Letters Patent should be read with this correction therein that the same may conform to the record of the case in the Patent Office.

Signed and sealed this 5th day of November, A. D. 1935.

Leslie Frazer (Seal)

Acting Commissioner of Patents.